United States Patent

Varrichione

[11] Patent Number: 5,914,769
[45] Date of Patent: Jun. 22, 1999

[54] REAR VIEW MIRROR FOR DIVERS

[76] Inventor: Andy Varrichione, 18610 Fort Smith Cir., Port Charlotte, Fla. 33948

[21] Appl. No.: 09/209,806

[22] Filed: Dec. 11, 1998

Related U.S. Application Data

[60] Provisional application No. 60/082,742, Apr. 23, 1998.
[51] Int. Cl.⁶ ....................................................... G02C 1/00
[52] U.S. Cl. ............................................... 351/158; 351/50
[58] Field of Search ..................... 351/50, 158; 2/209.14; 359/871, 879, 880

[56] References Cited

U.S. PATENT DOCUMENTS 1,431,147 10/1922 Borresen ..................................... 351/50
5,764,335 6/1998 Berke ......................................... 351/50

Primary Examiner—Huy Mai
Attorney, Agent, or Firm—Frank A. Lukasik

[57] ABSTRACT

The invention is directed to a rear view mirror which is attachable to most diving masks in production. A mirror retaining device is clipped by an attachment to the mask and a convex mirror is positioned in an operational position within the line of vision of the diver.

9 Claims, 25 Drawing Sheets

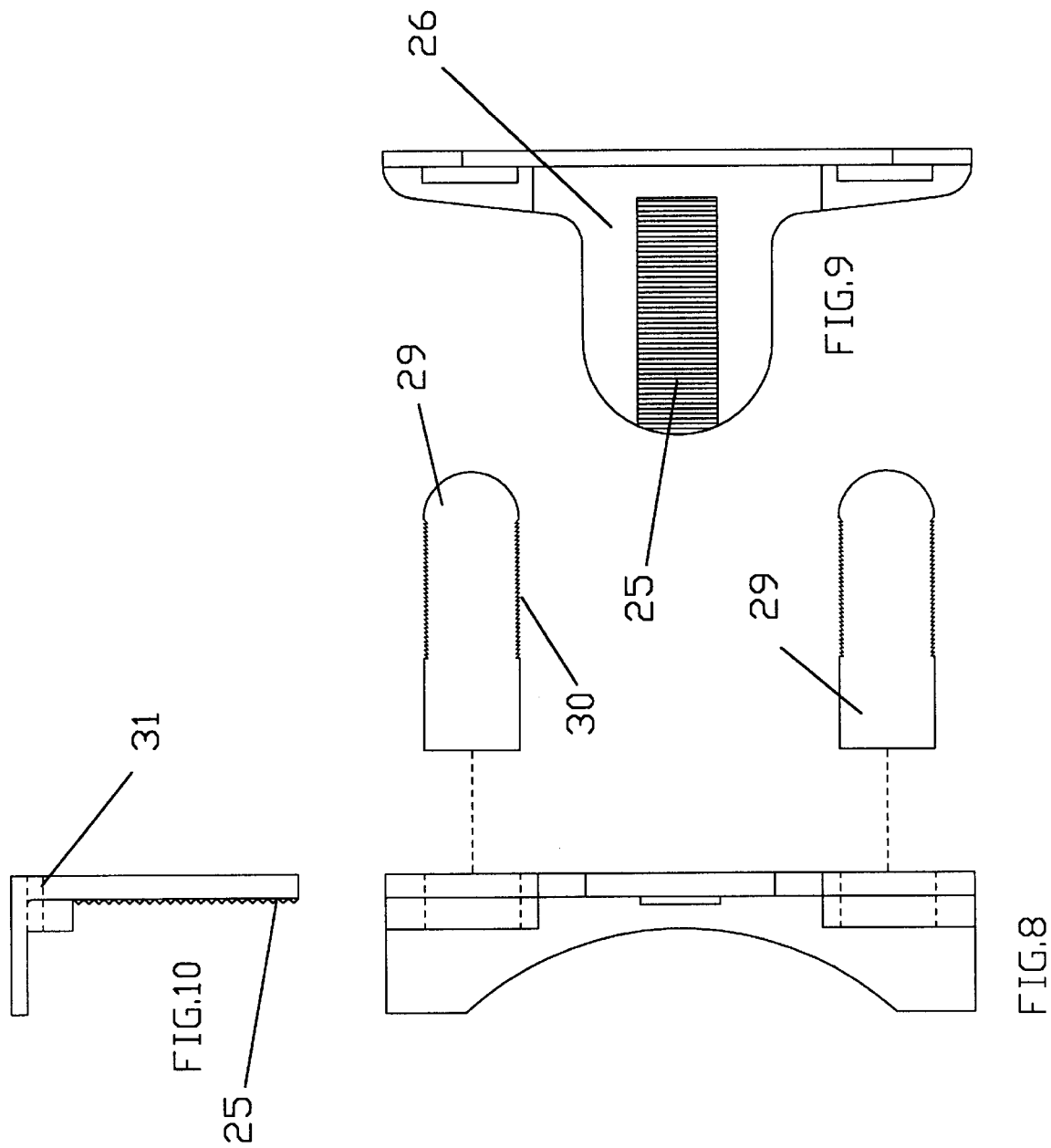

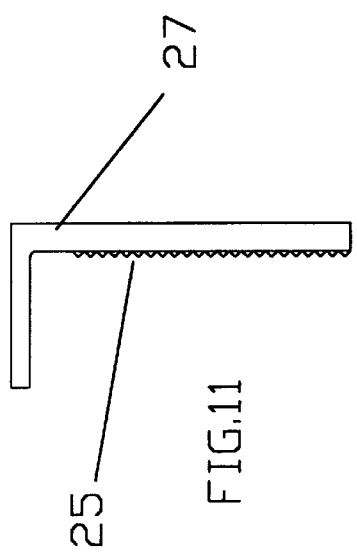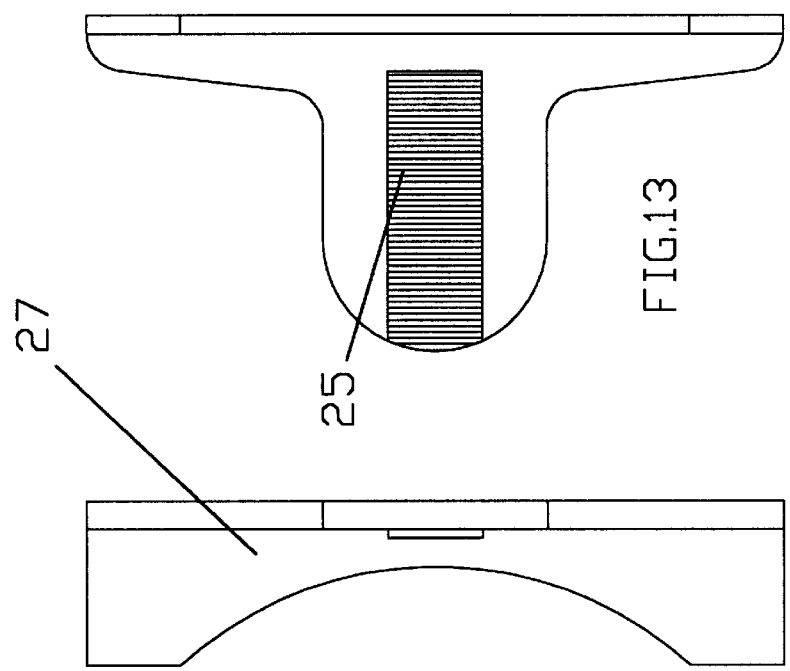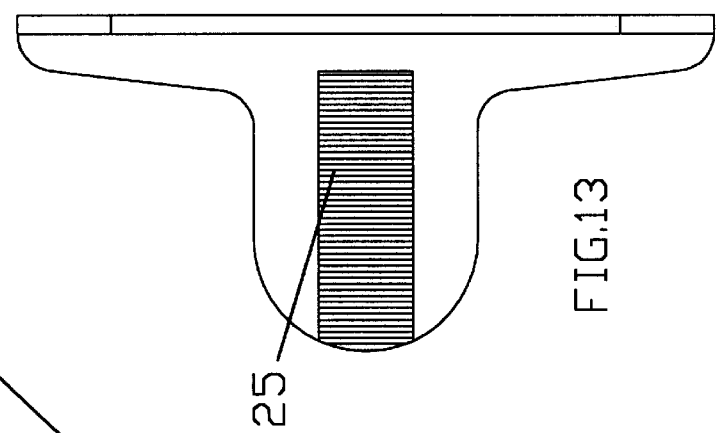

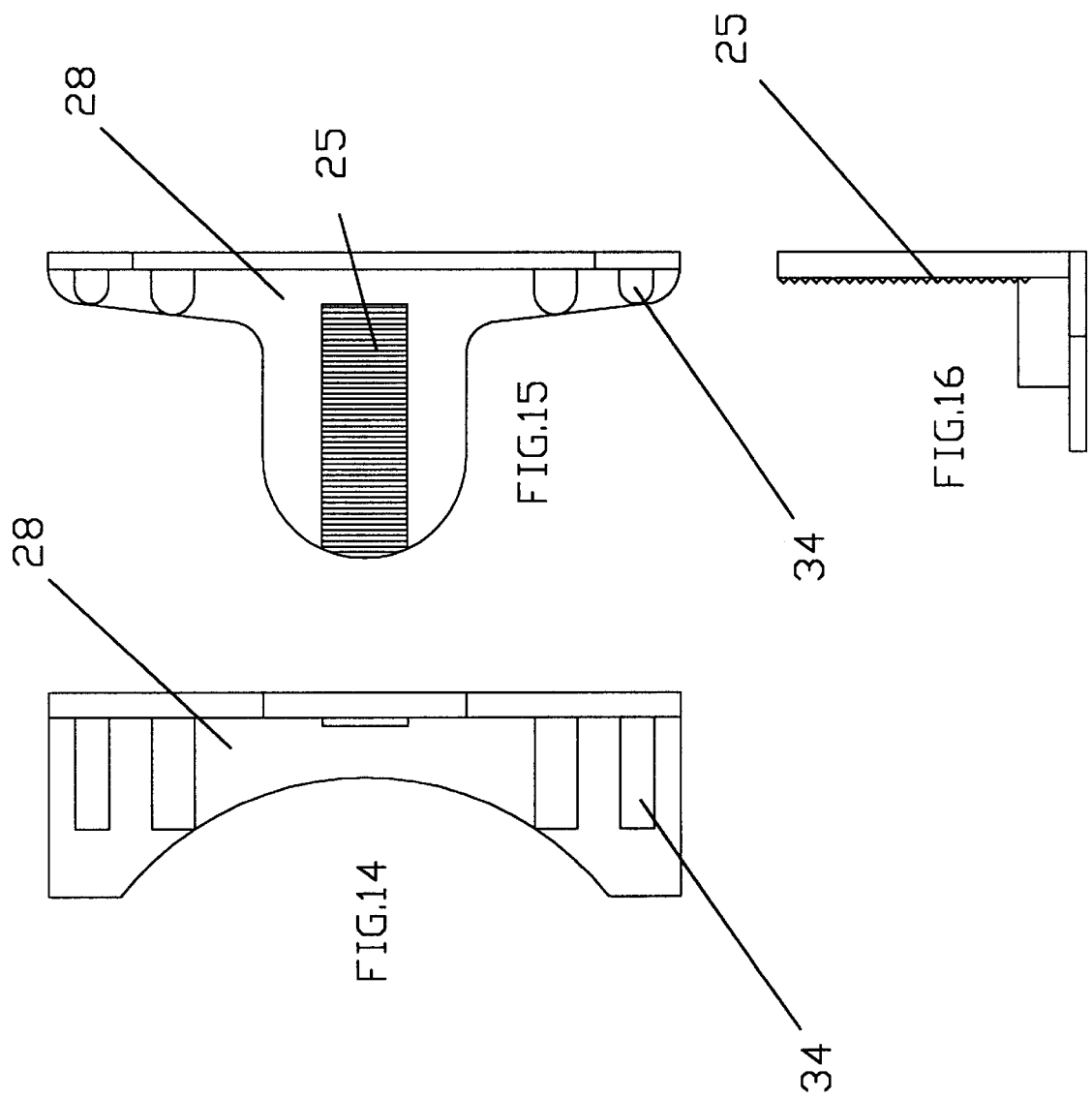

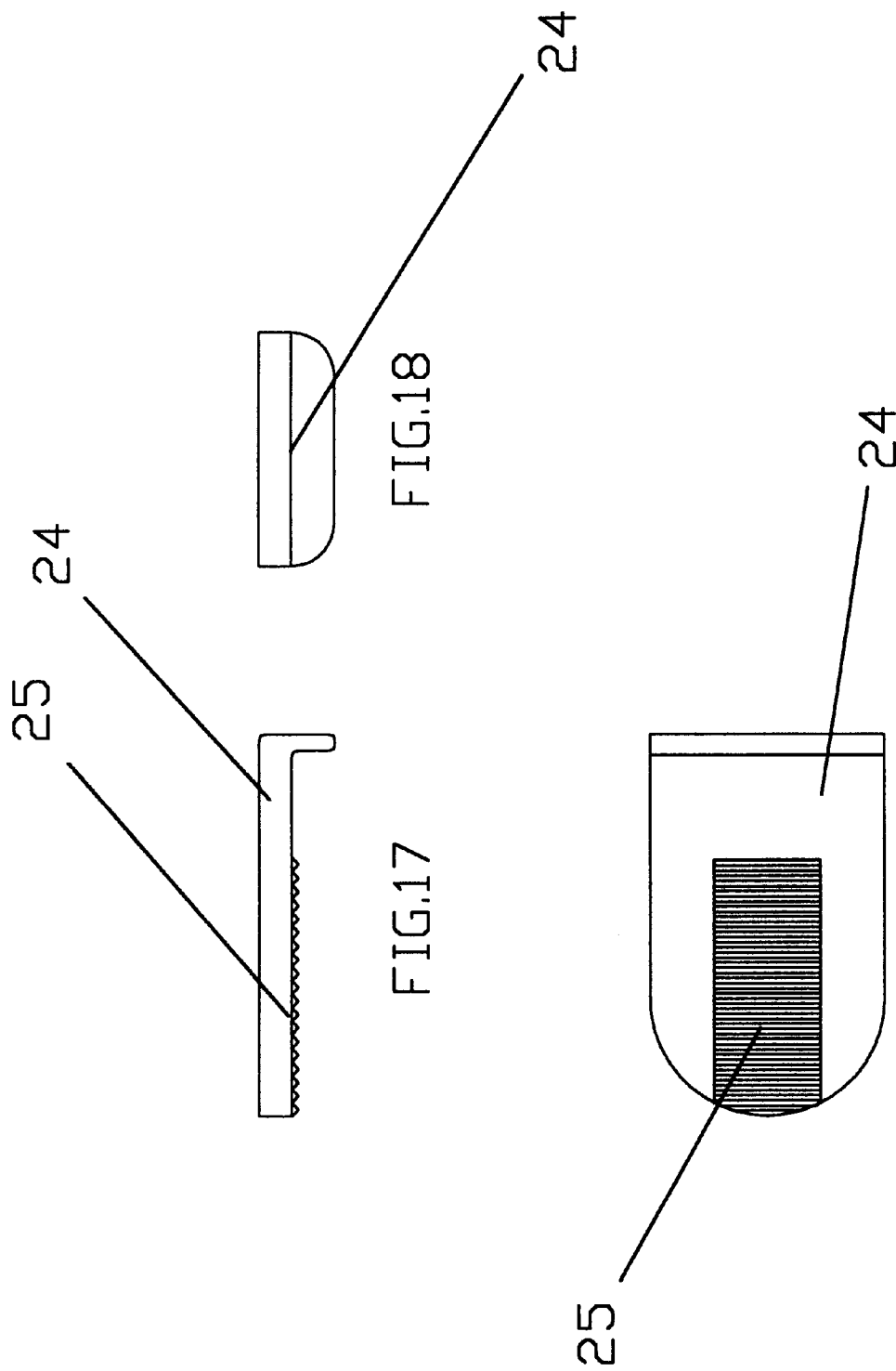

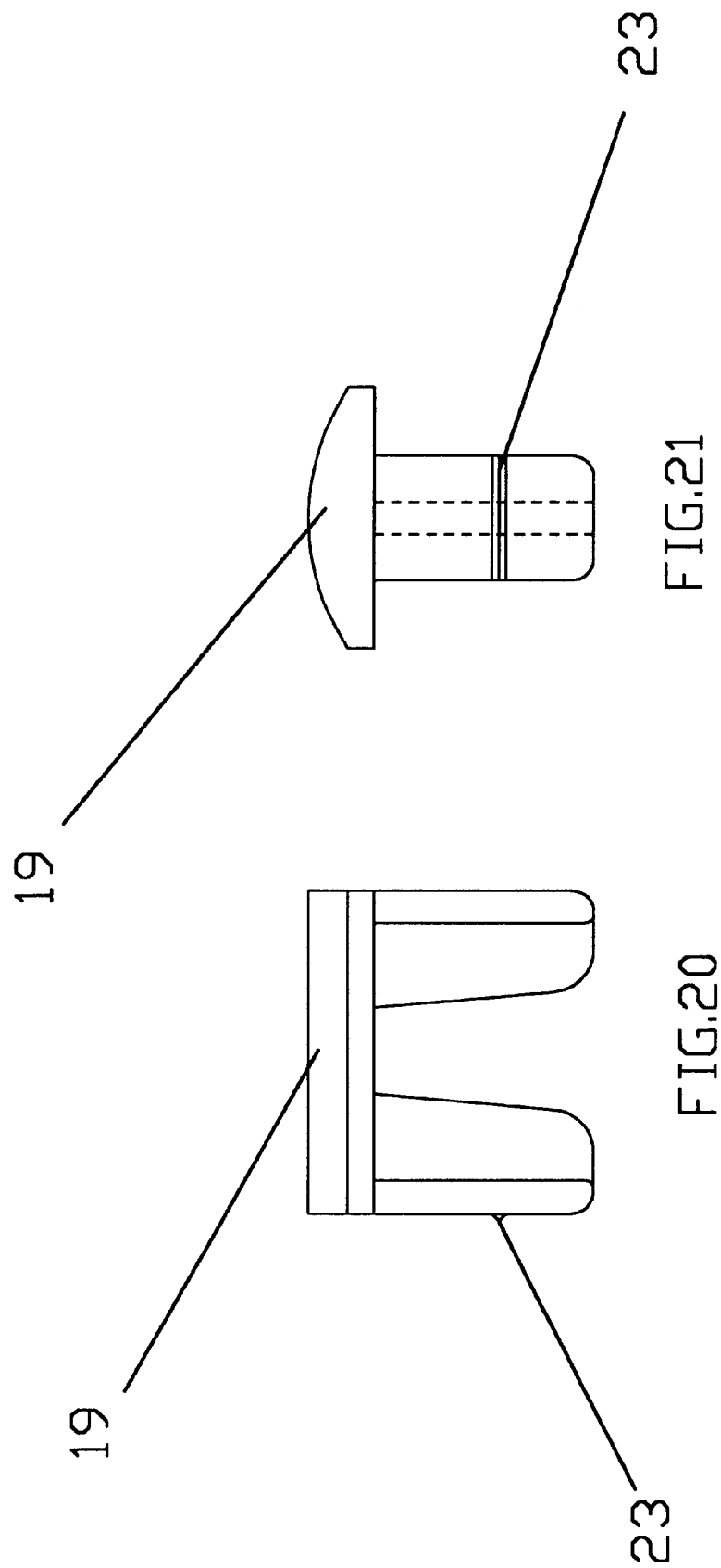

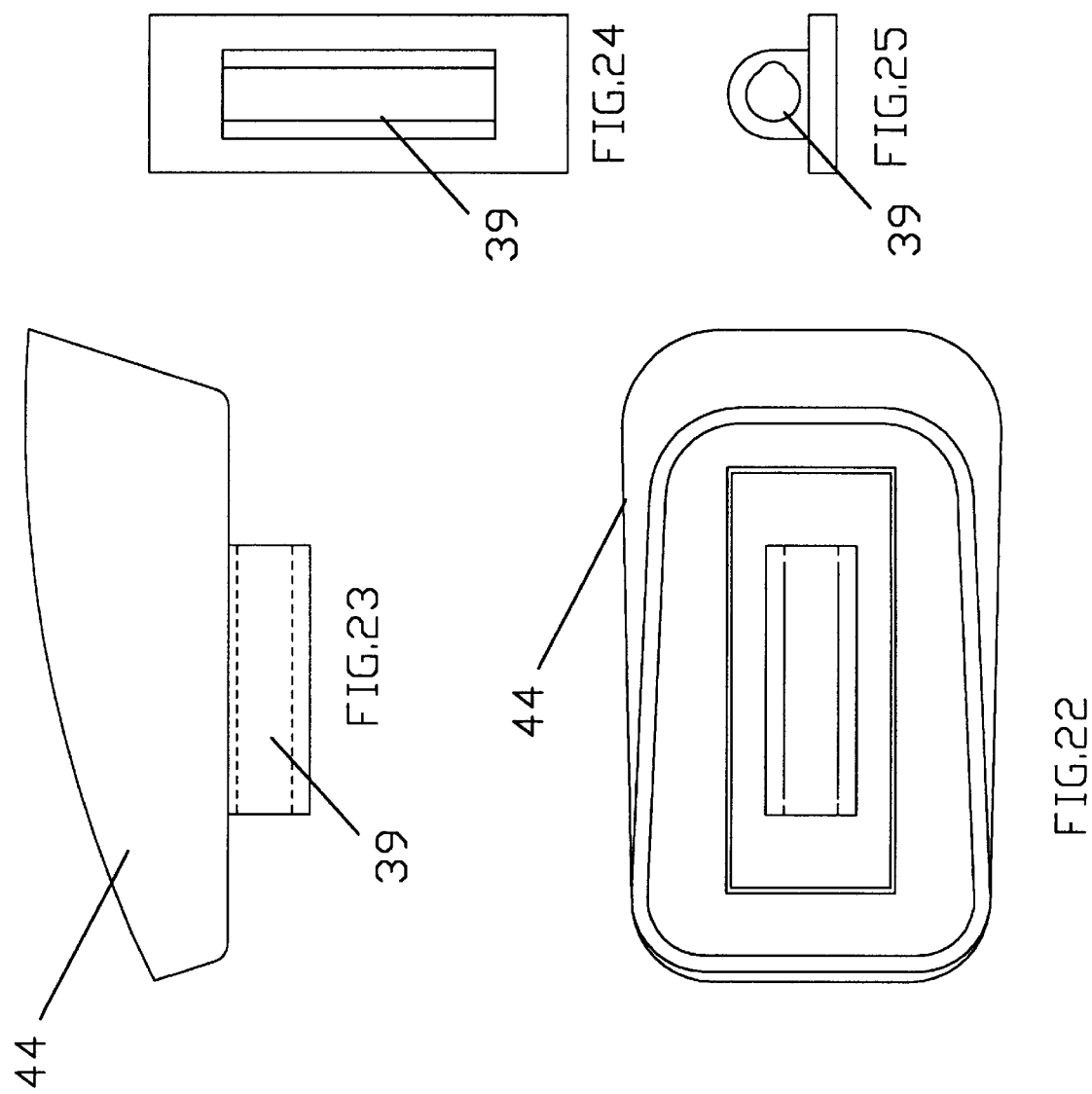

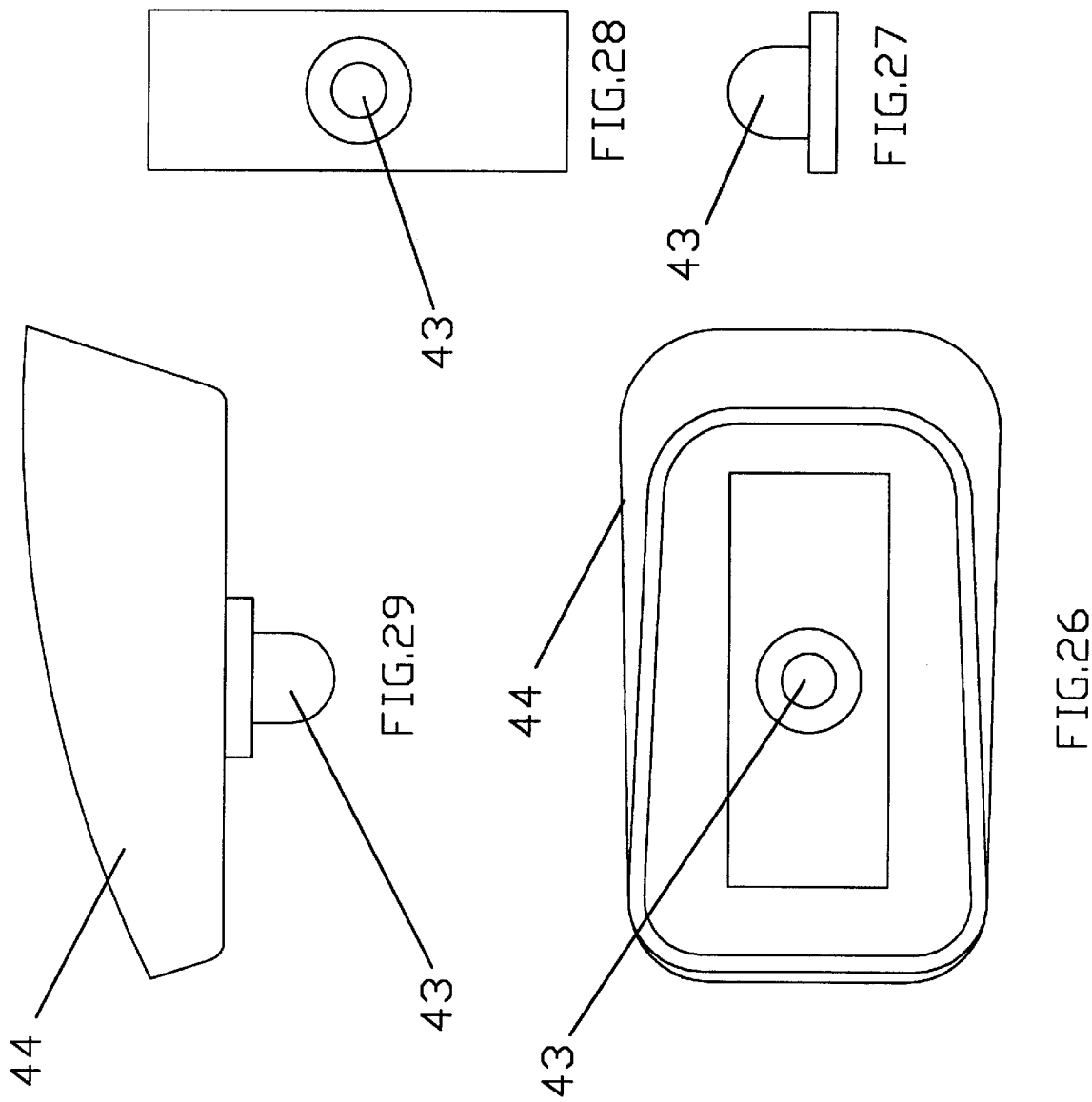

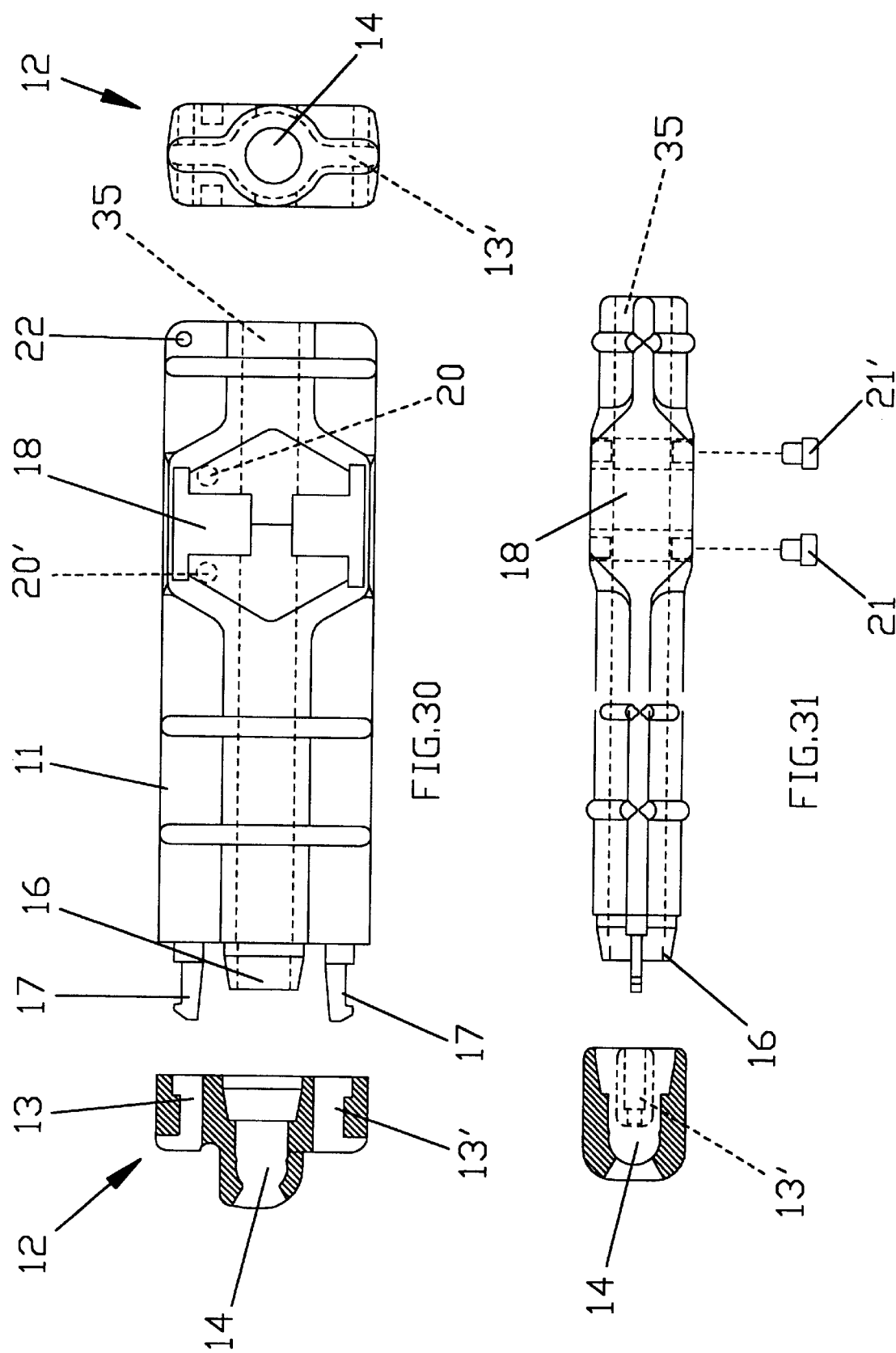

REAR VIEW MIRROR FOR DIVERS

This is a Continuation of Provisional Application Ser. No. 60/082,742, Filed Apr. 23, 1998.

BACKGROUND OF THE INVENTION

1. Field of the Invention

The invention relates to diver's equipment, and more specifically, the invention relates to a rear view mirror which is attachable to most diving masks in production.

2. Background of the Invention

A common problem that divers currently have is the inability to see what is behind them while underwater. First, it is important to know where other divers are located since it is possible to swim away without knowing where the other divers are and the diver may be out of sight of following divers. Second, a diver always has the fear of a shark or other dangerous sea creature coming up from behind in their blind spot.

One prior art device is shown in U.S. Pat. No. 5,216,454 to Berke which discloses a sportsman's face mask for viewing objects in the opposite direction of the normal line of vision. At least one prism, having a pair of complementary faces which are inclined to the and internally reflect rays from objects behind the swimmer into his forward field of vision, is mounted in front of the lens.

U.S. Pat. No. 5,764,334 to Berke discloses a diving mask with supplemental vertical, lateral and posterior fields of vision. A pair of sealed compartments at opposite ends of the diving mask have rotatable mirrorized surfaces which reflect light rays from objects above, below, on the side, and rear of the mask into a diver's view.

U.S. Pat. No. 5,170,190 to Berke discloses a water sportsman's face mask for viewing objects above and below the line of vision. A lens is mounted in front of the frame and a pair of triangular prisms mounted on the lens.

The instant invention is designed to overcome the rear view problems of the prior art with a mask mounted, adjustable rear view mirror.

SUMMARY OF THE INVENTION

The invention consists of a mirror retaining device which is clipped by an attachment means to the top of the mask allowing a convex mirror to be positioned in its operational position within the line of vision of the diver thus facilitating an extension of the diver's view behind, above and to each side as needed. A mirror retaining device provides flexibility of adjustment upwards or downwards. The mirror is slightly convex to prevent direct glare of the sun from being reflected into the eyes of the user and to provide a wider angle of view.

BRIEF DESCRIPTION OF THE DRAWINGS

FIGS. 8–10 are various elevations of an alternative embodiment of the attachment apparatus in accordance with the invention.

FIGS. 11–13 are various elevations of a further alternative embodiment of the attachment apparatus.

FIGS. 14–16 are various elevations of a further alternative embodiment of the attachment apparatus.

FIGS. 17–19 are various elevations of the rear clip attachment apparatus.

FIGS. 20–21 are front and side views respectively, of the locking clip device used to retain in place other components of the attachment means used to mount the mirror retaining device on the swim mask.

FIGS. 22–25 are various elevations of a first embodiment of the attachment means for the convex mirror device.

FIGS. 26–29 are various elevations of a second and preferred embodiment of the attachment means for the convex mirror device.

FIG. 30 is a plan elevation of the main body of the mirror attachment and retaining device showing a sectional plan view and an end elevation of its end cap.

FIG. 31 is a side elevation of the main body of the mirror attachment and retaining device showing also a cross-sectional side view of its end cap.

DETAILED DESCRIPTION OF THE PREFERRED EMBODIMENTS

Figure 1:
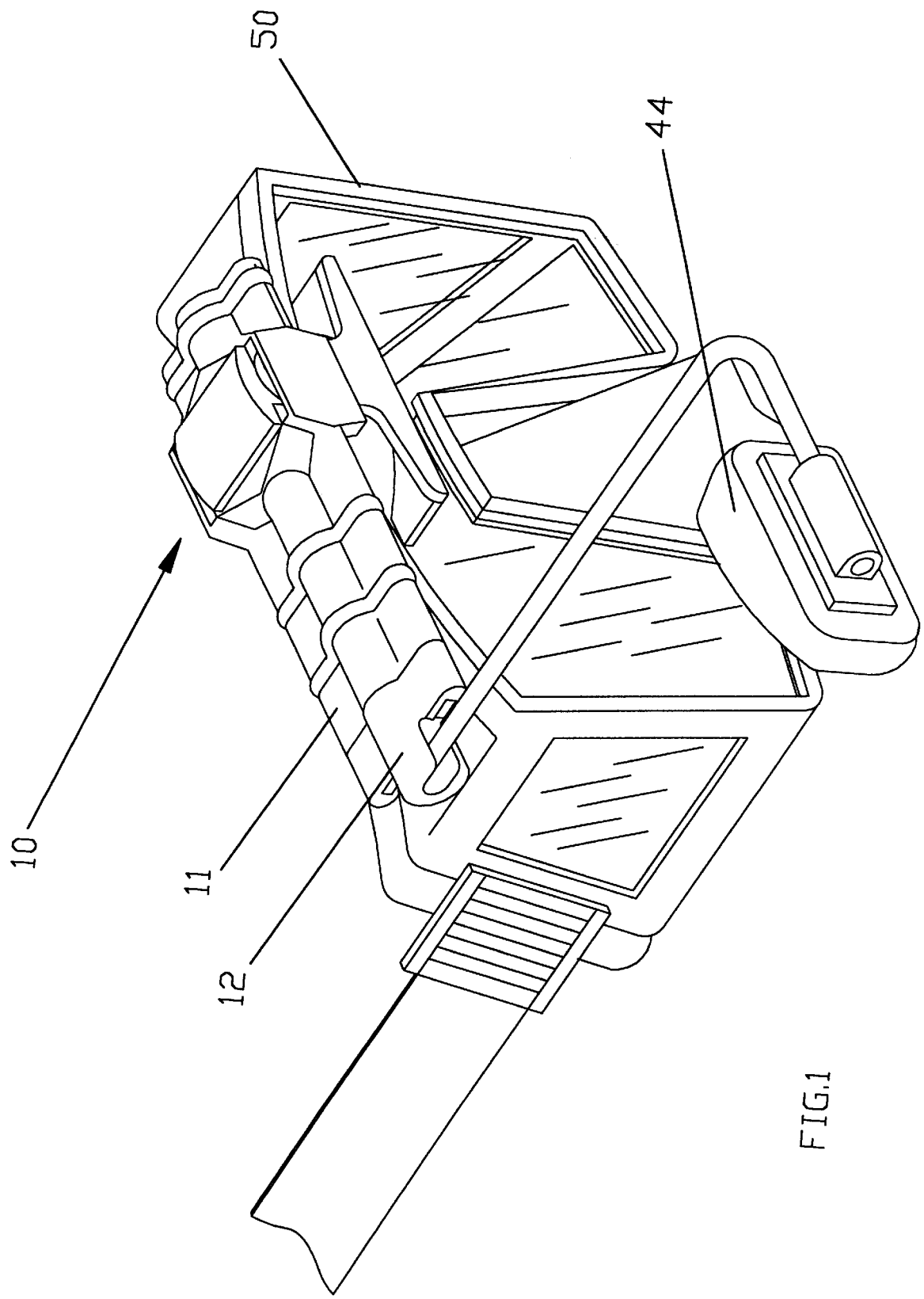
FIG. 1. is a perspective view of a diver's mask having an adjustable mirror retaining and storage device in accordance with the invention.
Figure 2:
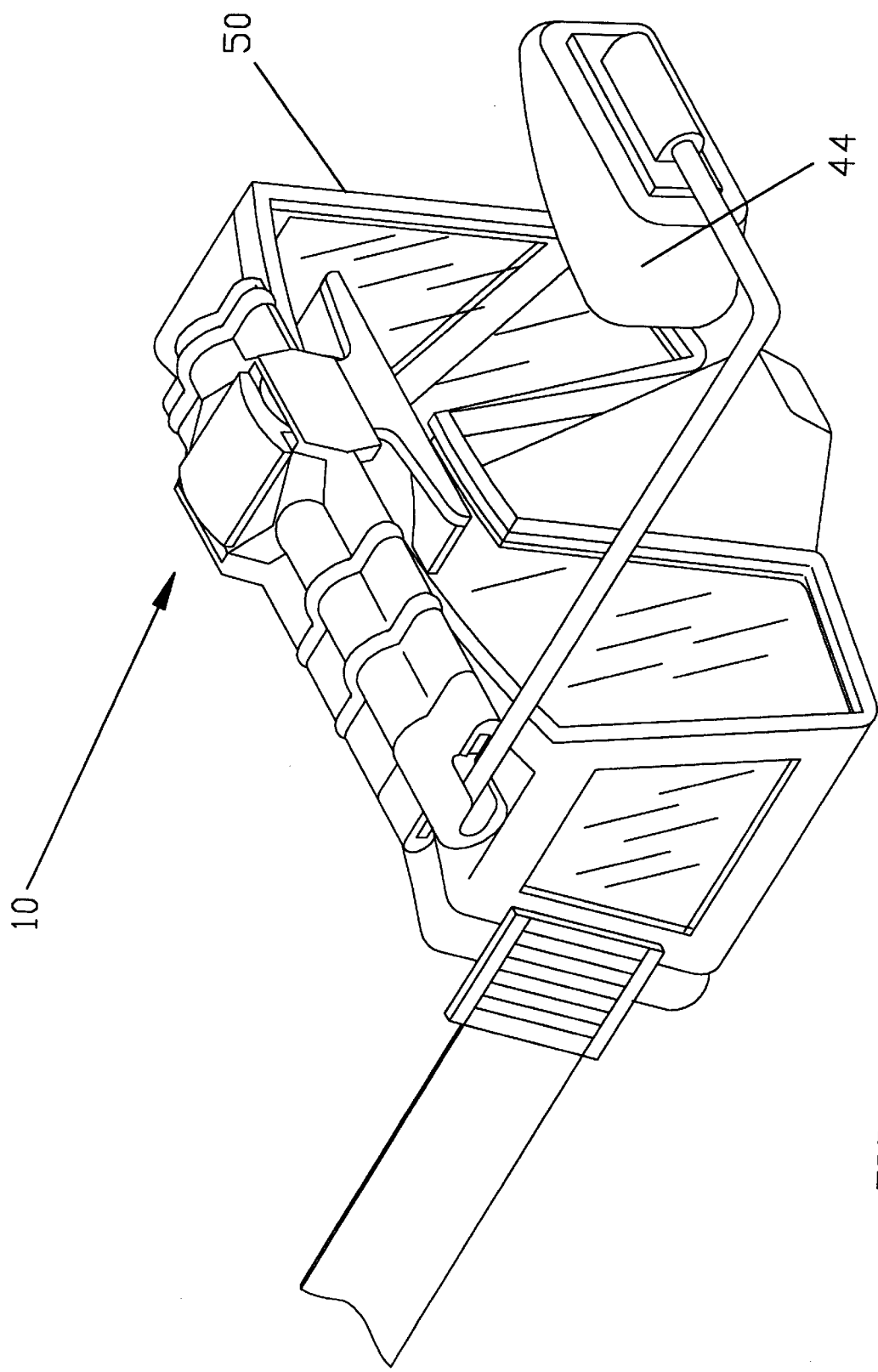
FIG. 2. is a perspective view of a diver's mask having an adjustable mirror retaining and storage device showing the mirror rotated 180 degrees as an alternative application.
Figure 3:
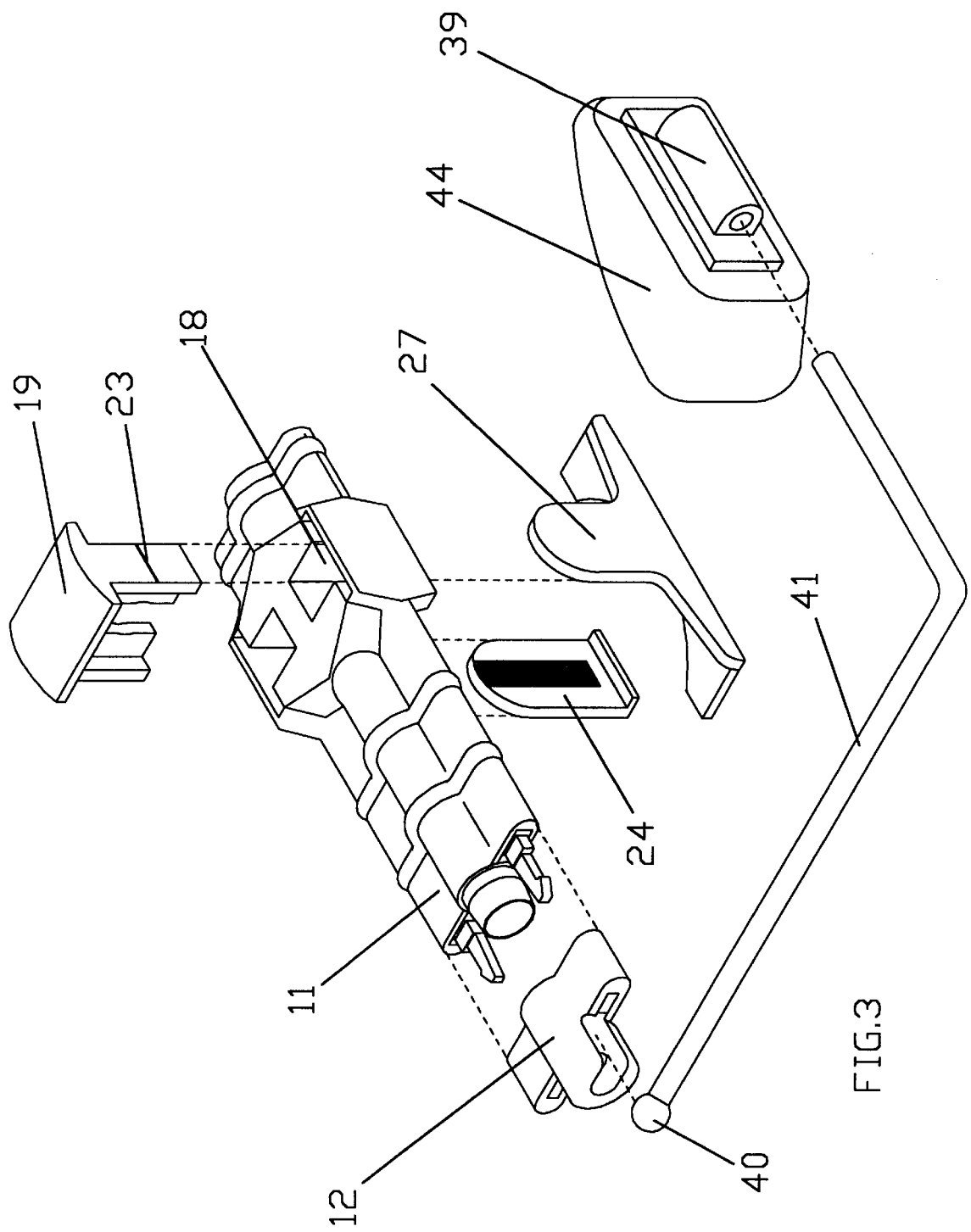
FIG. 3. is an exploded view showing components of the mirror retaining device.

Referring now to the drawings wherein like numerals designate like and corresponding parts throughout the several views, in FIGS. 1 and 2 a diver's mask is fitted with a mirror retaining device 10 which is clipped by an attachment means to the top of the mask 50 allowing convex mirror 44 to be positioned in its operational position within the line of vision of the diver thus facilitating an extension of the diver's view behind, above and to each side as needed. In FIG. 3, mirror retaining device 10 is shown in an exploded view wherein the relationship between each of its components is shown so that the main body 11 is positioned away from end cap 12 and top locking clip 19 into its pre-assembly position above. Rear locking clip 24 and front locking clip 27 are positioned below main body 11.

Figure 32:
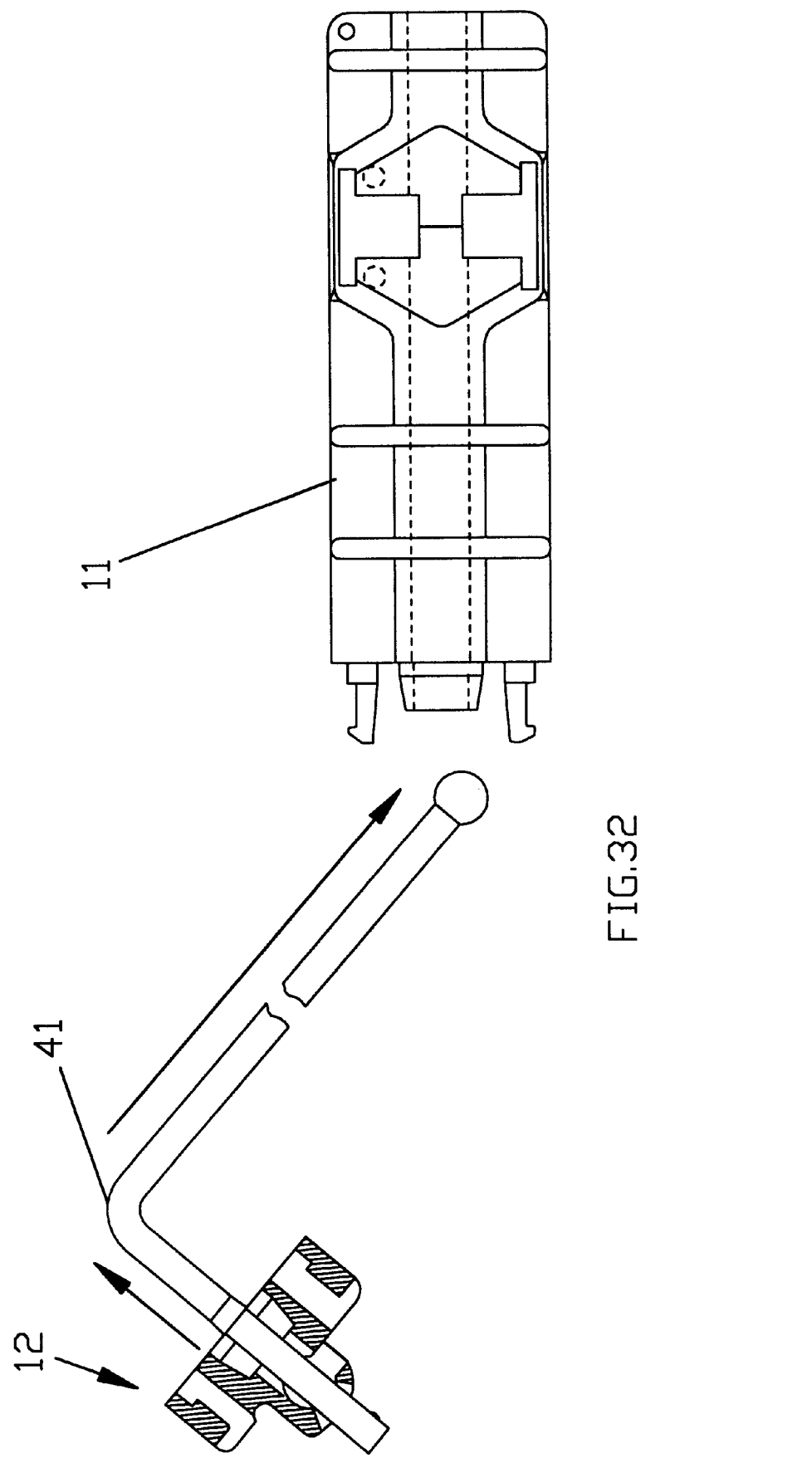
FIG. 32 is a plan elevation of the main body of the mirror attachment and retaining device positioned adjacent to and separate from its end cap, with the mirror support arm being inserted into the end cap in preparation for its attachment to the device in accordance with the invention.
Figure 33:
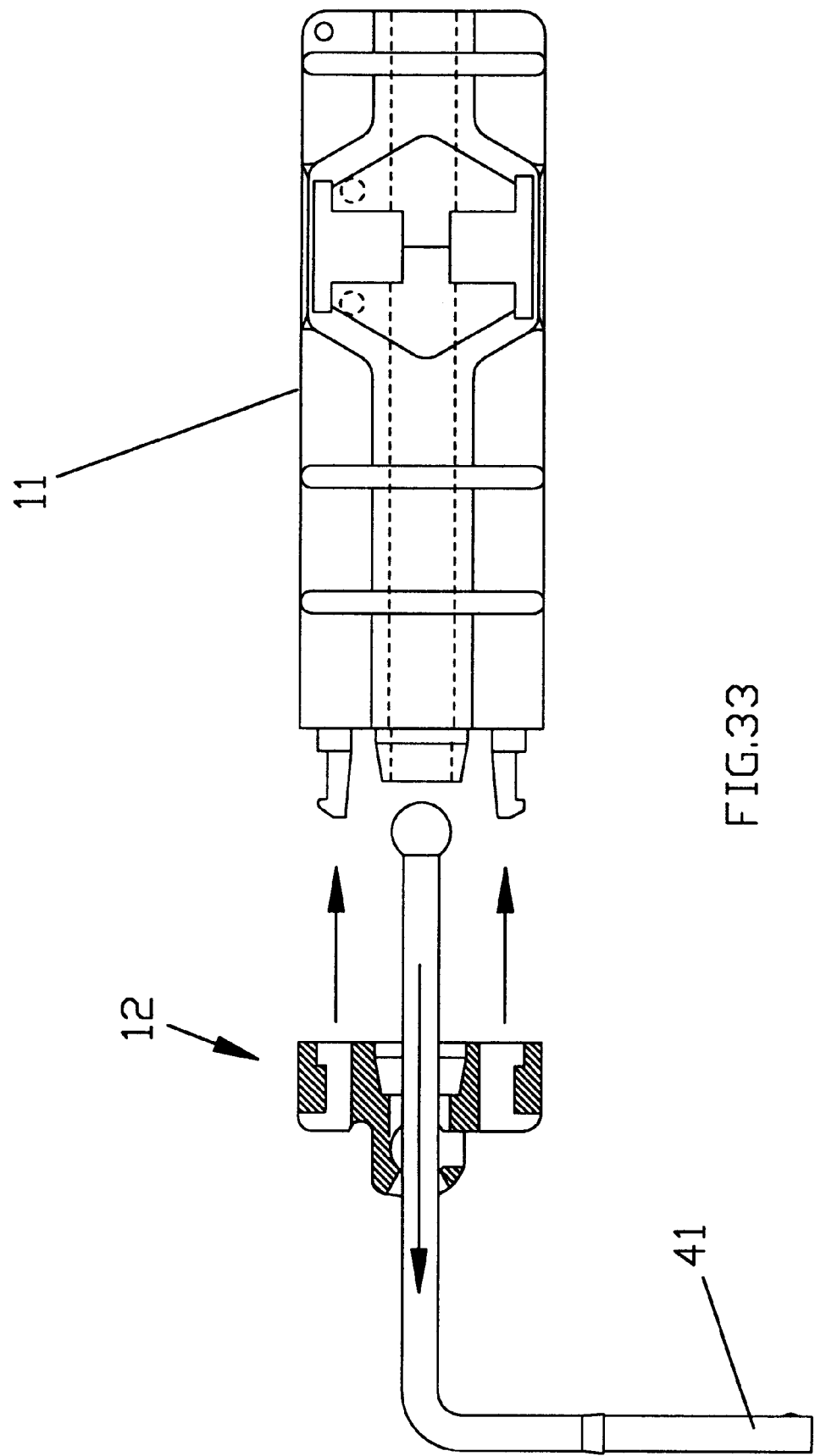
FIG. 33 is a plan elevation of the main body of the mirror attachment and retaining device positioned adjacent to and separate from its end cap, with the mirror support arm being further inserted into the end cap in preparation for its attachment to the device.
Figure 34:
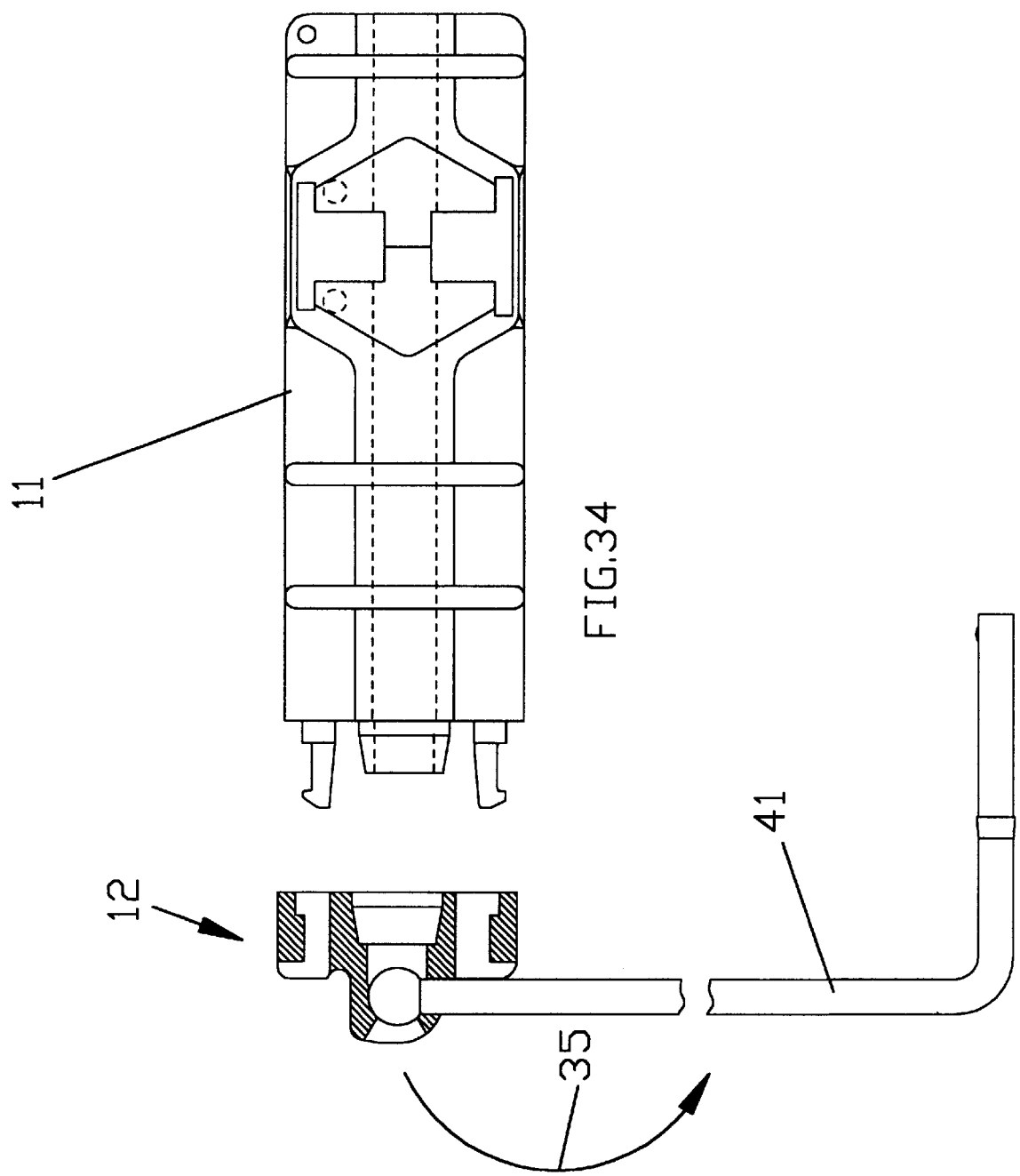
FIG. 34 is a plan elevation of the main body of the mirror attachment and retaining device positioned adjacent to and separate from its end cap with the mirror support arm being rotated into its operational position in the end cap in preparation for its attachment to the device.
Figure 35:
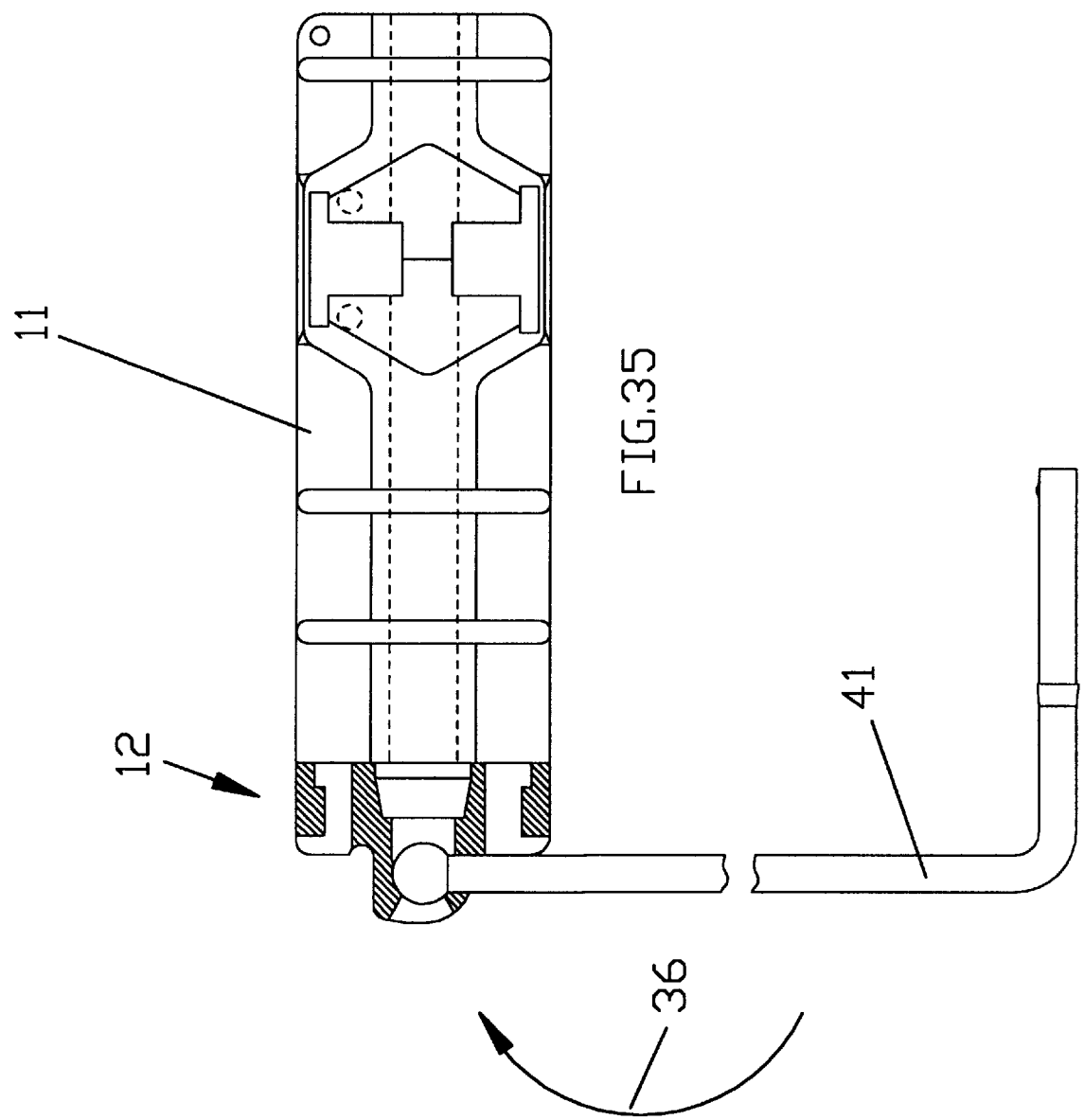
FIG. 35 is a plan elevation of the main body of the mirror attachment and retaining device with its end cap now attached, with the mirror support arm being rotated from its operational position in the end cap in preparation for its storage within the device.
Figure 36:
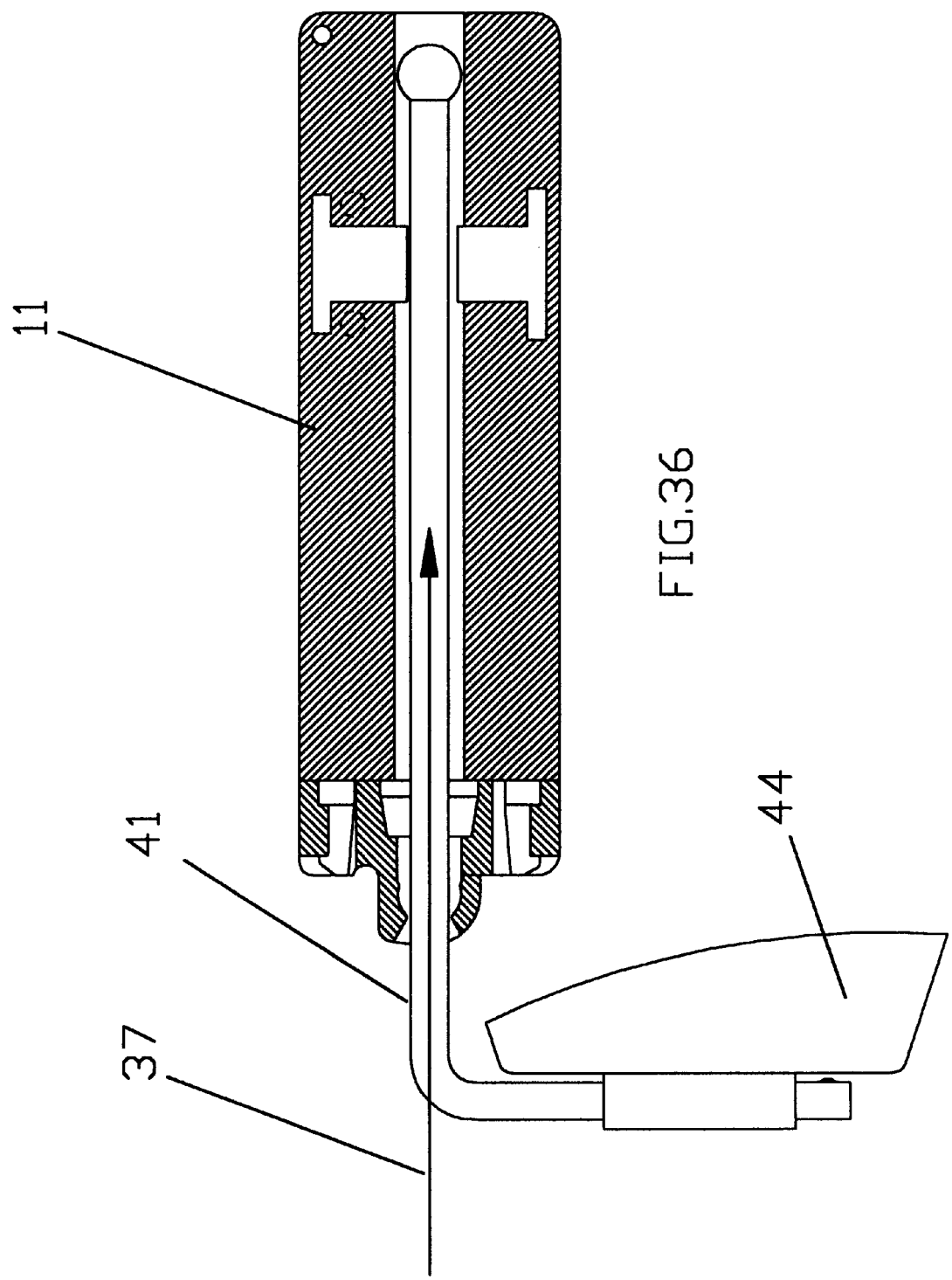
FIG. 36 is a plan elevation of the main body of the mirror attachment and retaining device with its end cap now attached, with the mirror support arm being slid into its storage position within the device.

Prior to mounting mirror-retaining device 10 to the top of the mask 50, mirror arm 41 is slid through end cap 12 as shown in FIGS. 32–36. Referring now to FIG. 32, end cap 12 is tilted to allow mirror arm 41 (without convex mirror 44 attached) to be passed through. In FIG. 33, end cap 12 is slid toward main body 11 and mirror arm 41 is allowed to pass fully into end cap 12. In FIG. 34, with mirror arm 41 now fully in place in end cap 12, it can be swiveled in the direction of arrow 35 to its operational position. In FIG. 35, end cap 12 is shown clipped onto main body 11 and mirror arm 41 is raised in the direction of arrow 36. FIG. 36 shows mirror 44 in its storage position, arrow 37 shows the direction mirror arm 41 is slid to place it in its storage position inside main body 11.

Figure 37:
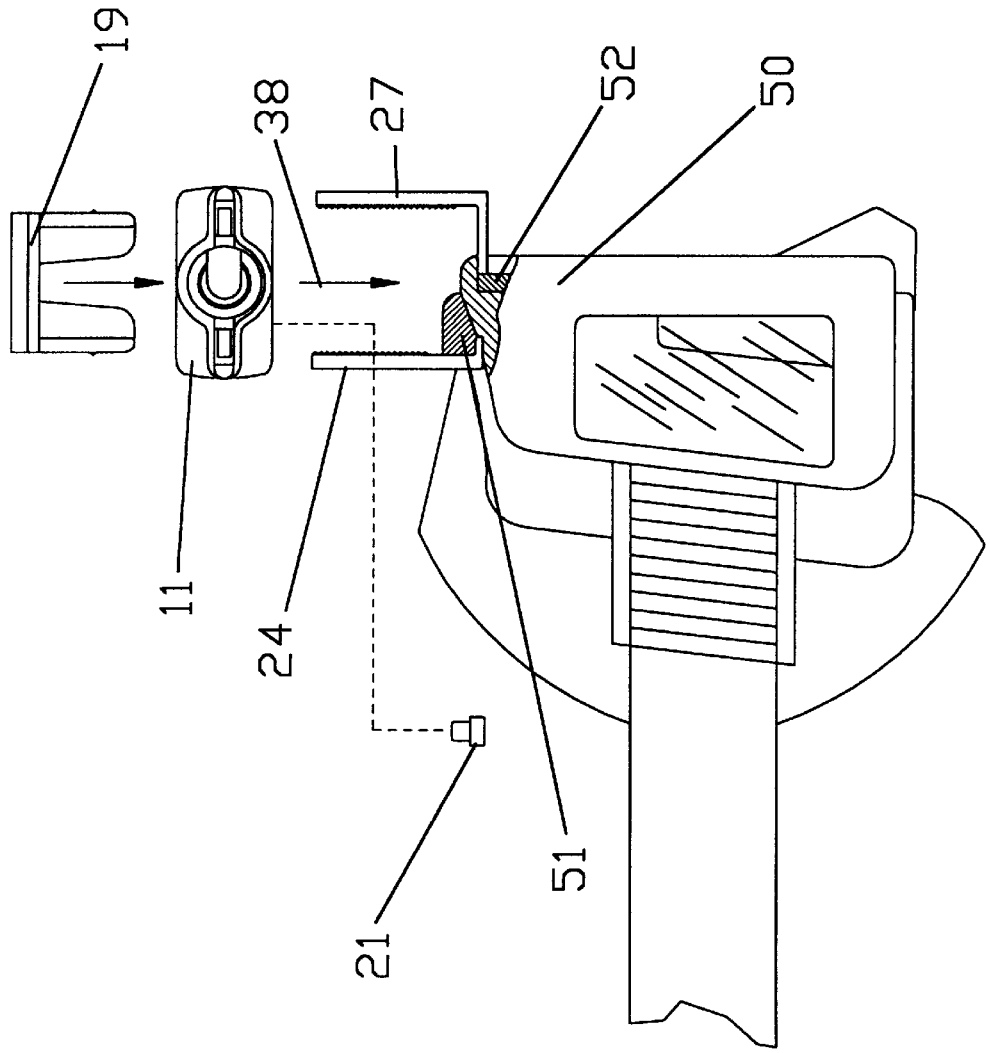
FIGS. 37–41 show the assembly and mounting sequence for the mirror retaining device as it is first assembled and then affixed into its operating position on the swim mask.

Referring now to FIG. 37, wherein the assembly/mounting sequence of the various components of the mirror mounting device 10 is commenced. A side elevation of mask 50 is shown partially in section to reveal the relationship between mask skirt 51, mask glass 52, front locking clip 27 and rear locking clip 24. (Optional leveling pin 21 can be used where a swim mask 50 is made without a level shoulder for the mirror mounting device 10 to rest securely thereupon).

FIGS. 30 and 31 show the position of the mounting holes 20 for leveling pins 21 and 21'. Mounting commences with the placement of rear locking clip 24 beneath mask skirt 51. Front locking clip 27 is positioned with its lip firmly against mask glass 52.

Figure 38:
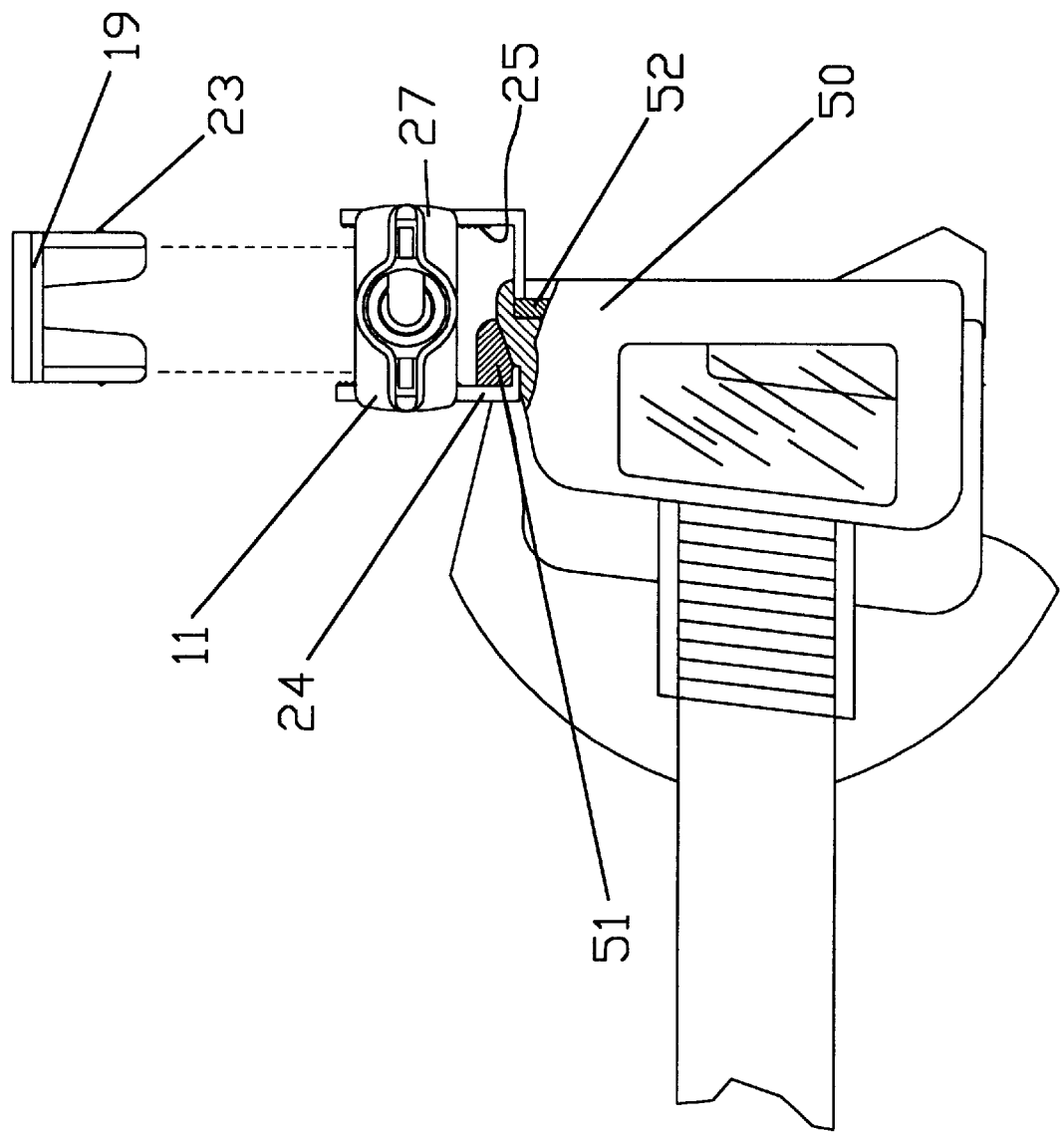
Figure 39:
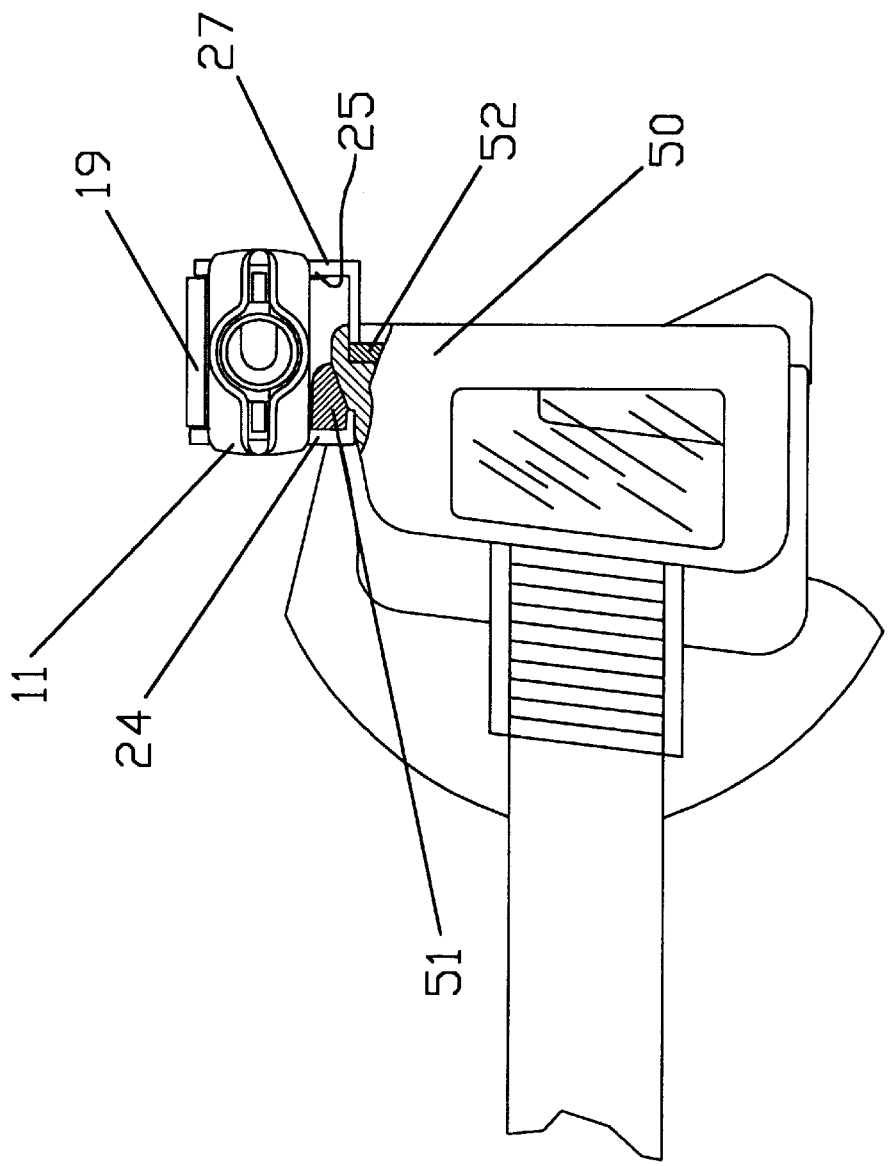
Figure 40:
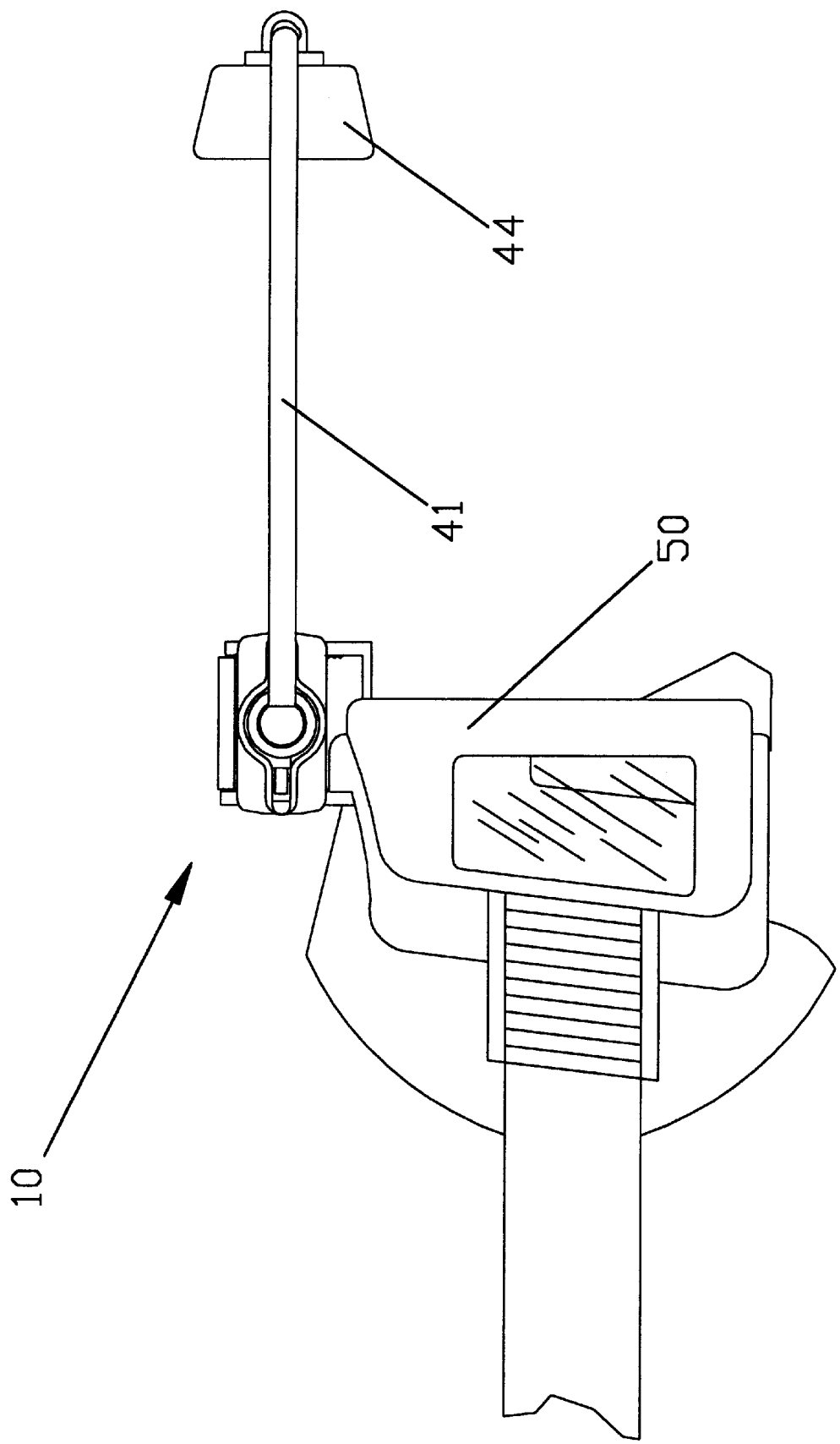
Figure 41:
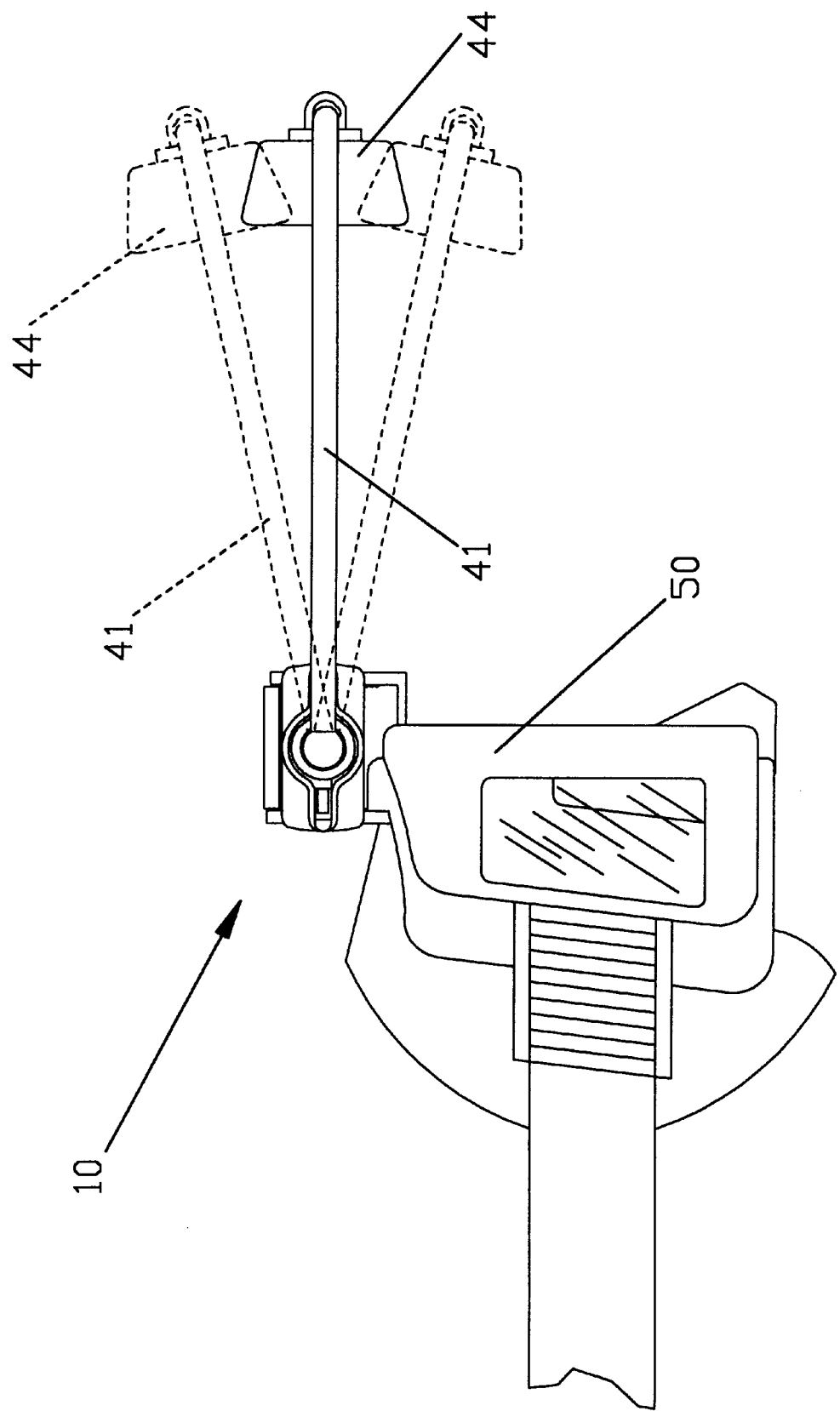

FIG. 2 shows the relative positions of main body 11, top locking clip 19, rear locking clip 24, front locking clip 27, and top clip chamber 18. Main body 11 is lowered into position. In FIG. 38, main body 11 has been lowered over the upright faces of rear locking clip 24 and front locking clip 27 so that they are confined within top clip chamber 18. Referring now to FIG. 3, top clip 19 has a locking ridge 23 (shown enlarged in FIGS. 20–21). As front and rear locking clips 24 and 27 respectively are offered up into top clip chamber 18, top locking clip 19 is pushed down into top clip chamber 18 causing locking ridge 23 to engage the serrated face 25 (See FIGS. 11–13 for enlargement of front locking clip 27 and FIGS. 17–19 for enlargement of rear locking clip 24). The simultaneous insertion of locking clips 24 and 27 from the bottom and top locking clip 19 from the top, results in a series of clicks as the serrations 25 on the clip 19 faces and locking ridge 23 on top clip 19 engage. Said engagement is what locks the device firmly in position atop the swim mask 50 as shown in FIG. 39. Mirror arm 41 and convex mirror 44 are omitted from FIGS. 37–39 for clarity. FIGS. 40 and 41 show the final operational installation of the mirror-mounting device 10. FIG. 41 shows the range of movement of the mirror arm assembly. Securing the device 10 through the use of adjustable clips as described herein, facilitates the use of swim masks of different types and specifications.

Figure 4:
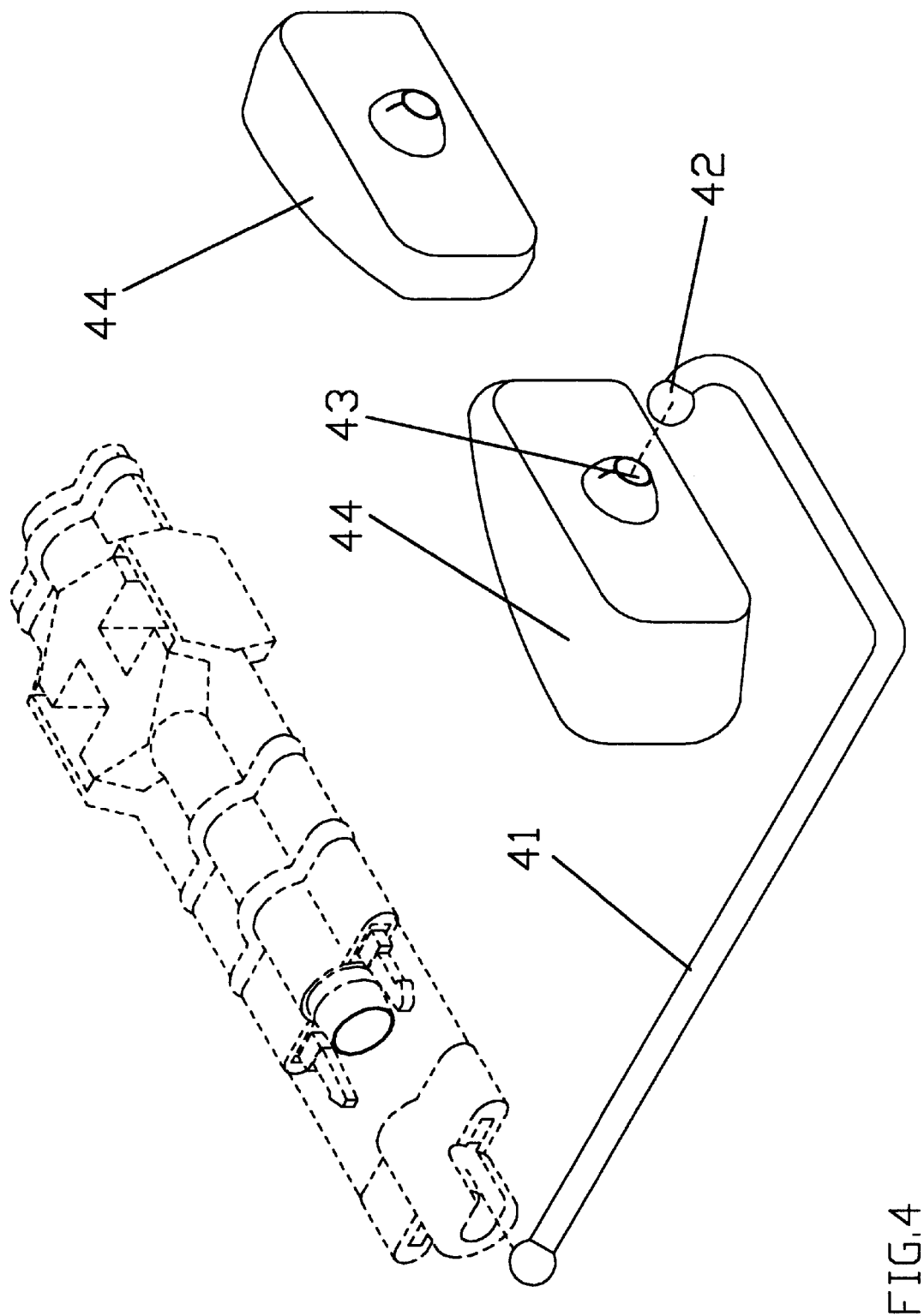
FIG. 4. is a perspective view showing the mirror-retaining device with an alternative embodiment of the mirror mounting apparatus.
Figure 5:
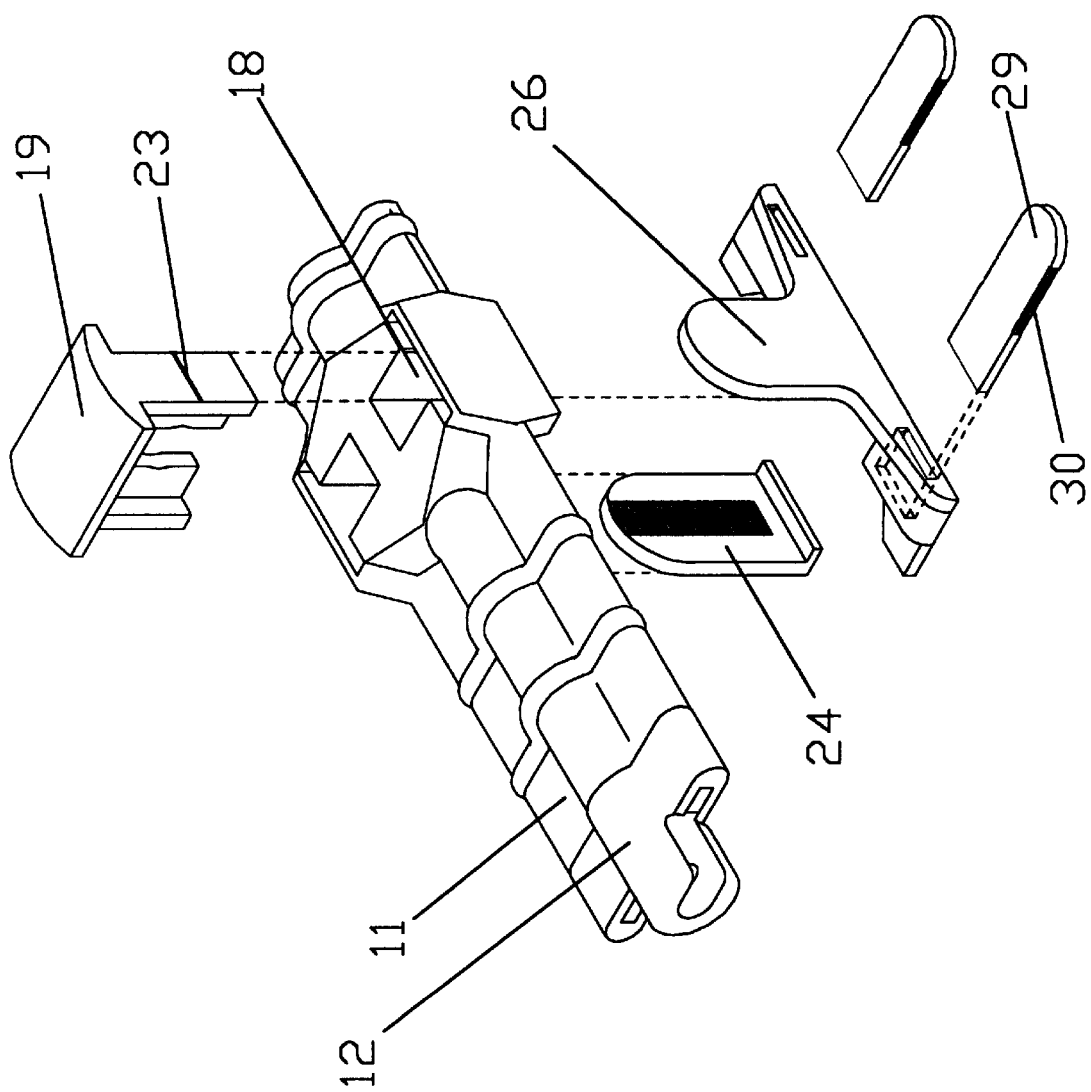
FIG. 5. is an exploded view showing components of the mirror retaining device and an alternative embodiment of the attachment apparatus.

Referring now to FIGS. 22–29, a rear view of convex mirror 44 is shown in FIG. 22 and FIGS. 23–25 show other views which illustrate the mounting attachment 39. This fitting is used with a mirror arm 41 without a second ball joint whereas in FIGS. 26–29 a ball joint socket 43 is shown as the preferred embodiment. FIGS. 3 and 4 show the differences between the straight mirror arm 41 with one ball-joint end 40 (FIG. 3) and a "U" shaped mirror arm 41 with an additional ball-joint 42 at its furthermost end. FIG. 4 also shows convex mirror 44 in two of the many possible positions to which it can be adjusted using the ball-socket joints 40 at either end of mirror arm 41. The mirror arm 41 can be adjusted at a 20° angle up and down and from 180° to 90°, and the mirror 44 can swivel 360°.

Referring now to FIGS. 5–8, specifically to the characteristics of front locking clip 26, in the enlargement of front locking clip 26 and its ancillary components, adjustable locking clips 29, locking clip slots 31 are shown in sectional detail to illustrate locking ridge 32 (present on each side of aperture 31). In use, adjustable locking clips 29 are used to facilitate a variable adjustment of the distances between the vertical plane of front locking clip 26 and mask glass 52 (FIGS. 37–39), thus permitting the use of swim masks with differing specifications. The characteristic use of serrated faces and locking ridges throughout the instant device provides a positive method of fixing together the component parts into a compact resilient unit, which is secure enough to remain in position atop a diver's mask while diving, while retaining the ease of disassembly required for routine maintenance cleaning, etc.

Figure 6:
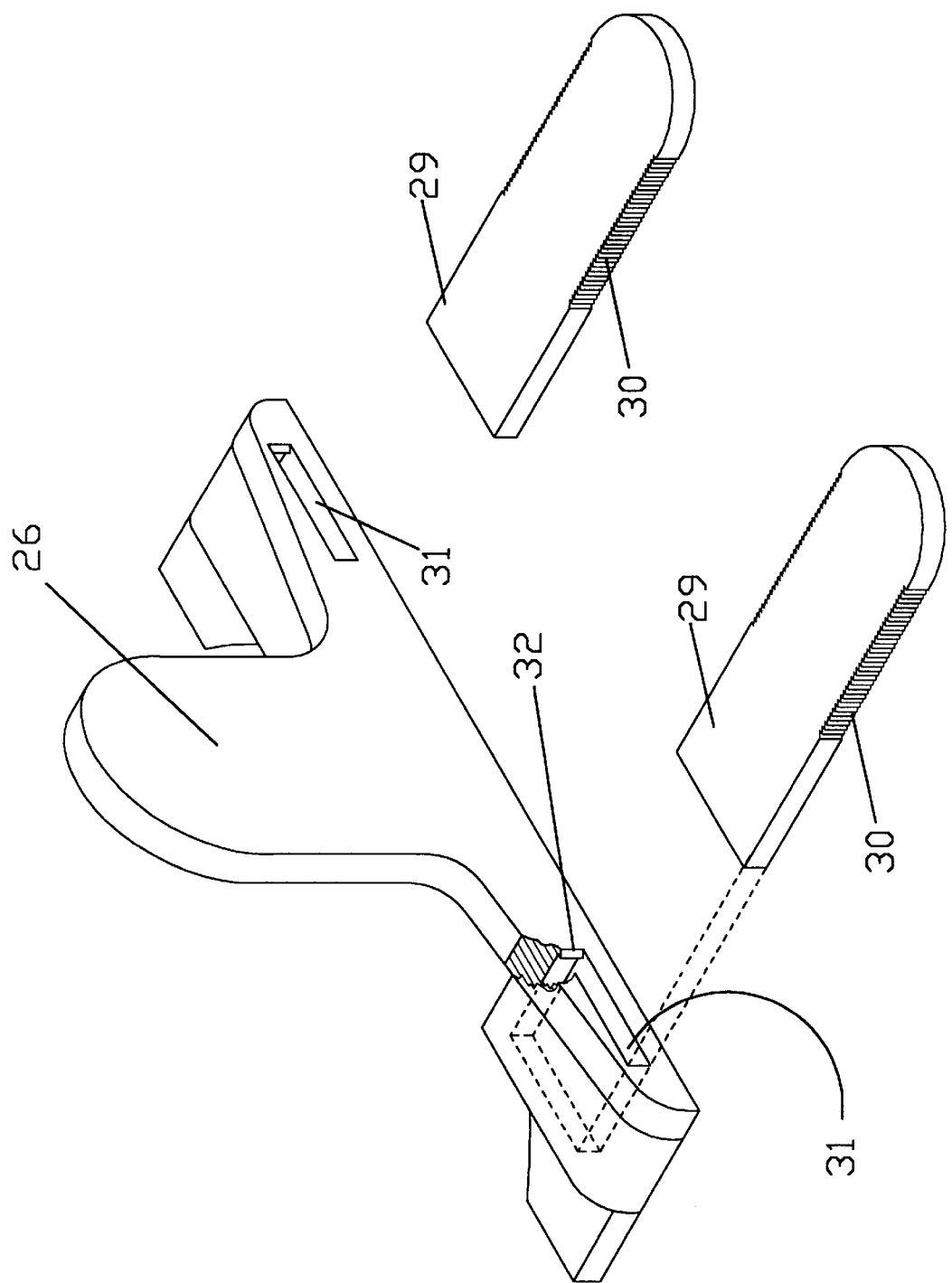
FIG. 6. is a perspective view of an alternative embodiment of the attachment apparatus showing a cross sectional detail of the attachment means used to adjust the fitting of the mirror retaining device for different mask configuration.
Figure 7:
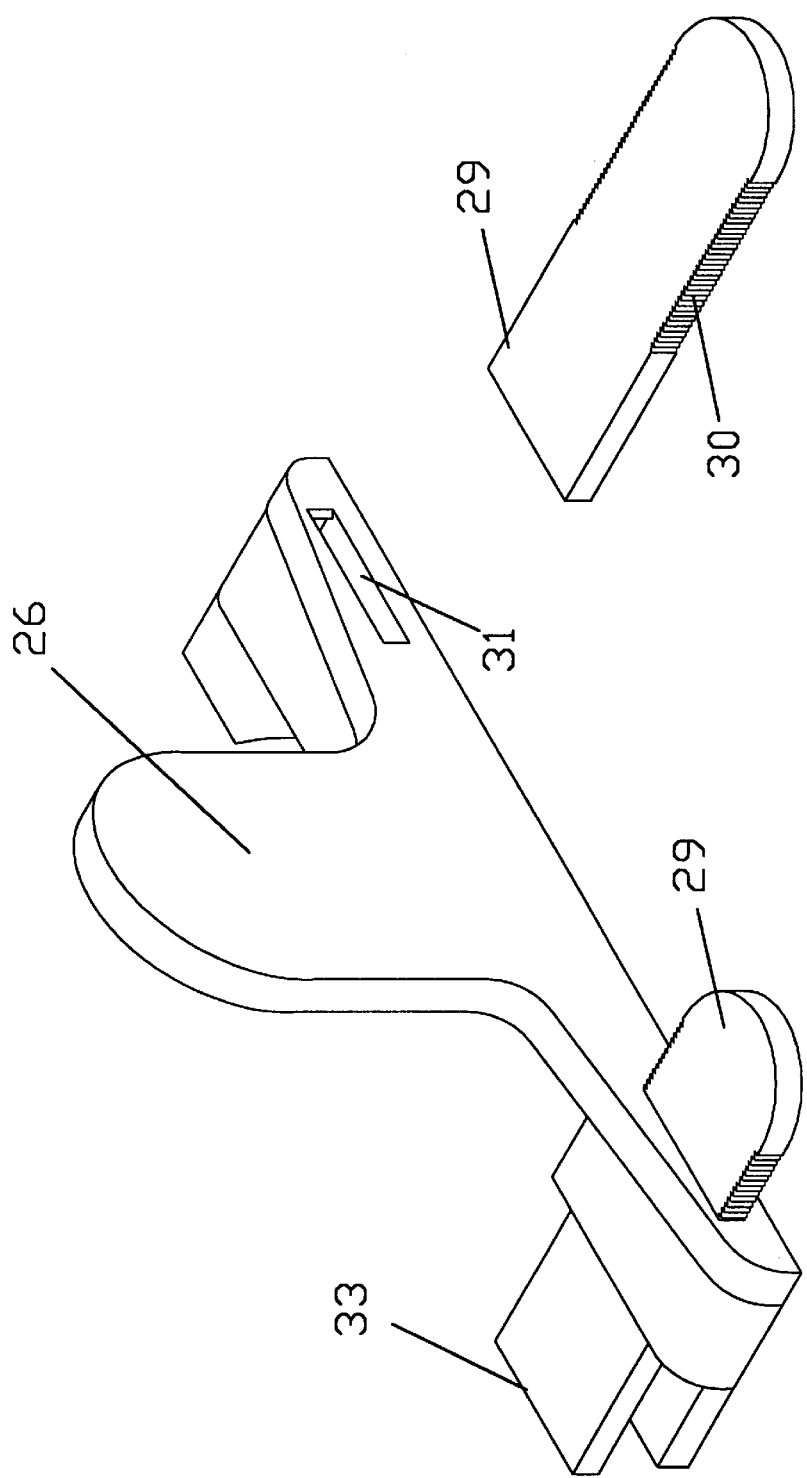
FIG. 7. is a perspective view of an alternate embodiment of the attachment apparatus showing the attachment means in place as it would be used to adjust the fitting of the mirror retaining device for different mask configurations.

Referring now to FIGS. 11–16, these are alternate embodiments of front locking clips. Front clip 27 is used where a particular mask configuration permits its use without need to adjust in relation to the mask glass 52. Similarly, front locking clip 28, through the addition of ridges 34, permits its use on masks where there is no need to adjust it in relation to the mask glass 52. The preferred embodiment is as shown in FIG. 6 with adjustable front clip 26.

The mirror mounting device 10 of the invention may be made from high-quality, ABS plastic and in a variety of colors. Mirror 40 is a marine mirror.

Thus it will be appreciated that the present invention provides a novel diver's rear view mirror which can be mounted on most existing dive masks. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. A rear view mirror device for mounting on a diver's mask, said device consisting of:

a main body having a ball socket and a pair of retainer clips formed at a first end, a mating guide formed at a second end and a chamber formed through said body and perpendicular to said body, an end cap having a pair of clip apertures and a ball socket formed therein, a mirror arm having a first end and a second end, said mirror arm having a ball joint formed at said first end and a right angle bend formed therein, said mirror arm second end being inserted through said ball socket formed within said end cap, said ball joint being inserted within said main body ball socket and said end cap clip apertures being mated with said main body retainer clips thereby forming a single unit, a front locking clip and a rear locking clip, said front locking clip positioned on said mask and said front locking clip positioned firmly against said mask, said main body chamber being combined with said front and rear locking clips, a top locking clip being positioned within said main body chamber and combined with said front and rear locking clips thereby locking said main body firmly on said diver's mask, and a convex mirror pivotally mounted on said mirror arm second end.

2. A rear view mirror device for mounting on a diver's mask recited in claim 1 wherein said top clip contains a locking ridge and said front locking clip contains a serrated face for locking said top clip in position when assembled together.

3. A rear view mirror device for mounting on a diver's mask recited in claim 1 wherein said said front locking clip is formed with adjustable locking clips forming a variable adjustment of distances to accommodate different size masks.

4. A rear view mirror device for mounting on a diver's mask recited in claim 1 wherein said mirror arm second end is formed with a ball joint and said mirror is formed with a ball socket for assembling said mirror to said mirror arm.

5. A rear view mirror device for mounting on a diver's mask recited in claim 1 wherein said main body is formed with a pair of leveling pin holes and a pair of leveling pins are inserted in said leveling pin holes.

6. A locking device for mounting a main body on the top of a mask having a mask skirt and a mask glass, said device consisting of:

a main body having a first clip chamber and a second clip chamber formed therein, said clip chambers being spaced apart, and parallel to each other, said main body being positioned on the top of the mask, above said mask skirt, a rear locking clip having a first end and a second end, said first end being inserted under said mask skirt and said second end being inserted within said first clip chamber, a front locking clip having a first end and a second end, said first end being inserted within said second chamber and said second end being positioned against said mask glass, and a top locking clip being inserted within said main body first and second clip chambers, thereby engaging said front locking clip and said rear locking clip into a secure position atop said mask skirt.

7. A locking device for mounting a main body on the top of a mask recited in claim 6 wherein said top clip contains a locking ridge and said front locking clip contains a serrated face for locking said top clip in position when assembled together.

8. A locking device for mounting a main body on the top of a mask recited in claim 6 wherein said front locking clip is formed with adjustable locking clips forming a variable adjustment of distances to accommodate different size masks.

9. A locking device for mounting a main body on the top of a mask recited in claim 6 wherein said main body is formed with a pair of leveling pin holes and a pair of leveling pins are inserted in said leveling pin holes.

\* \* \* \* \*